US011296985B2

(12) United States Patent
Moreno et al.

(10) Patent No.: US 11,296,985 B2
(45) Date of Patent: Apr. 5, 2022

(54) NORMALIZED LOOKUP AND FORWARDING FOR DIVERSE VIRTUAL PRIVATE NETWORKS

(71) Applicant: CISCO TECHNOLOGY, INC., San Jose, CA (US)

(72) Inventors: Victor Moreno, Carlsbad, CA (US); Sanjay Kumar Hooda, Pleasanton, CA (US); Rex Emmanuel Fernando, Fremont, CA (US); Syam Sundar Appala, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 70 days.

(21) Appl. No.: 16/939,300

(22) Filed: Jul. 27, 2020

(65) Prior Publication Data
US 2022/0029915 A1   Jan. 27, 2022

(51) Int. Cl.
*H04L 12/741* (2013.01)
*H04L 45/74* (2022.01)
*H04L 12/46* (2006.01)

(52) U.S. Cl.
CPC .......... *H04L 45/74* (2013.01); *H04L 12/4641* (2013.01)

(58) Field of Classification Search
CPC ............................ H04L 45/74; H04L 12/4641
USPC ....................................................... 370/392
See application file for complete search history.

(56) References Cited

U.S. PATENT DOCUMENTS

| 6,023,563 A | 2/2000 | Shani | |
|---|---|---|---|
| 2015/0071286 A1* | 3/2015 | de Silva | H04L 45/74 370/392 |
| 2015/0124822 A1* | 5/2015 | Chu | H04L 12/18 370/392 |
| 2015/0124826 A1* | 5/2015 | Edsall | H04L 45/74 370/392 |
| 2017/0026417 A1* | 1/2017 | Ermagan | H04L 63/0272 |

(Continued)

FOREIGN PATENT DOCUMENTS

| EP | 3370158 A1 | 9/2018 |
|---|---|---|
| GB | 2513188 A | 10/2014 |
| WO | 2013117166 A1 | 8/2013 |

OTHER PUBLICATIONS

"International Search Report and Written Opinion issued in International Patent Application No. PCT/US2021/041930 filed Jul. 16, 2021", dated Oct. 29, 2021.

*Primary Examiner* — Hee Soo Kim
(74) *Attorney, Agent, or Firm* — Lee & Hayes, P.C.

(57) ABSTRACT

This technology enables normalized lookup and forwarding for diverse virtual private networks in multi-site network fabric deployments. A source device on a first Layer 2 site transmits a frame to a destination device on the same subnet, but on a second Layer 2 site. The frame is encapsulated and routed to a fabric border node. The fabric border node matches the source subnet to the destination subnet and transmits an address request protocol ("ARP"). In response to not receiving a reply to the ARP, the fabric border node transmits a map request to a Layer 3 transit fabric control plane node. The control plane node extracts a destination identifier from the map request and determines that the destination identifier is a Layer 2 identifier. The control plane node transmits a map reply to the fabric border node, where the frame is re-encapsulated and forwarded to the destination device.

20 Claims, 9 Drawing Sheets

(56) References Cited

U.S. PATENT DOCUMENTS

| | | | |
|---|---|---|---|
| 2018/0019927 A1* | 1/2018 | Addanki | H04L 12/4641 |
| 2019/0319871 A1* | 10/2019 | Indiresan | H04L 45/586 |
| 2020/0389426 A1* | 12/2020 | Enguehard | H04L 61/2007 |
| 2021/0352013 A1* | 11/2021 | Devaraj | H04L 45/74 |

* cited by examiner

NORMALIZED LOOKUP AND FORWARDING FOR DIVERSE VIRTUAL PRIVATE NETWORKS

TECHNICAL FIELD

This disclosure relates to a consolidated lookup mechanism to transfer network traffic across all types of Virtual Private Networks ("VPNs") in a single flow.

BACKGROUND

In conventional network fabric deployments, network fabrics are able to offer different types of Virtual Private Network ("VPN") services, for example, Layer 2 and Layer 3 VPNs. In the context of Layer 2 and Layer 3 network fabrics, the process for a Layer 2 fabric to transmit a frame from a host on one Layer 2 site to a host on a separate Layer 2 site may become very complicated. In conventional systems, forwarding network traffic between separate Layer 2 sites on the same subnet is difficult without a Layer 2 Virtual eXtensible Local Area Network ("VXLAN") network identifier ("VNI") between the sites. In conventional systems, a bespoke method for lookups and forwarding is utilized, which is a heterogeneous environment that is complex to implement and operate. A multitude of variants presents a large quantity of objects and object instances. The dependency map between the objects is intricate, making automation challenging.

DETAILED DESCRIPTION

Overview

Figure 1:
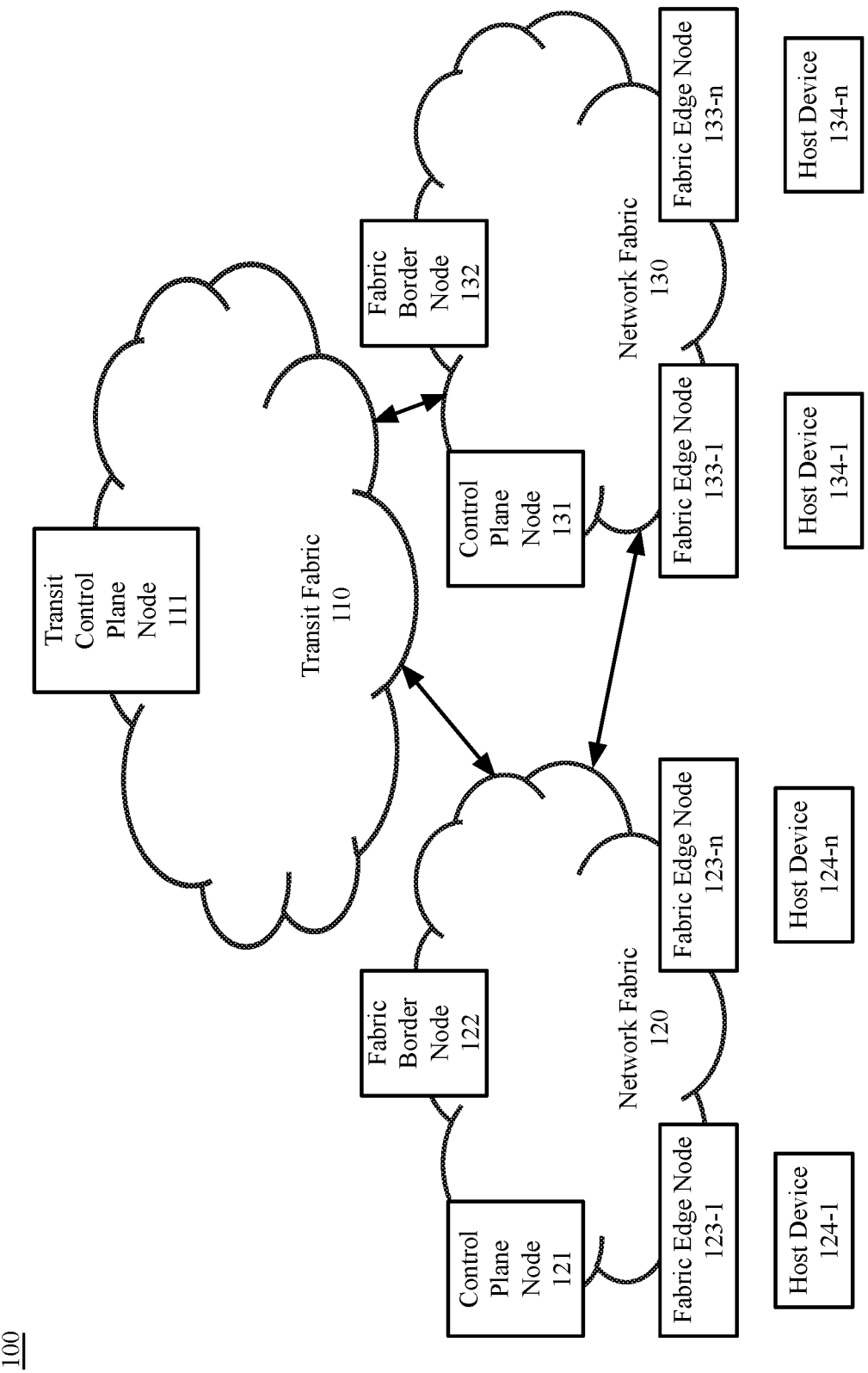
FIG. 1 is a block diagram depicting a multi-site network fabric system, in accordance with certain examples.

The present technology allows normalized lookup and forwarding for diverse Virtual Private Networks ("VPNs"). Example VPNs include remote access VPNs, intranet-based site-to-site VPNs, and extranet-based site-to-site VPNs. A VPN may be a Layer 2 VPN or a Layer 3 VPN. Layer 2 VPNs consolidate Layer 2 traffic such as Ethernet, Frame Relay, asynchronous transfer mode ("ATM"), High Level Data Link Control ("HDLG"), and Point-to-Point ("PPP") over an Internet Protocol ("IP")/Multiprotocol Label Switching ("MPLS") network. Layer 3 VPNs use Border Gateway Protocol ("BGP") to distribute VPN-related information. Layer 3 VPNs utilize virtual routing and forwarding ("VRF") to create and manage user data, and use a combination of IP and MPLS-based networking technologies.

VPNs also may include network fabrics. A network fabric is a network overlay that is a logical topology that virtually connects devices and is built on top of an arbitrary physical underlay topology. Examples of network overlays include Generic Routing Encapsulation ("GRE") or multipoint Generic Routing Encapsulation ("mGRE"), Multiprotocol Label Switching ("MPLS"), Virtual Private LAN Service ("VPLS"), Internet Protocol Security ("IPSec"), dynamic multipoint virtual private network ("DMVPN"), Control And Provisioning of Wireless Access Points ("CAPWAP"), Location ID Separation Protocol ("LISP"), Overlay Transport Virtual ("OTV"), Dynamic Fabric Automation ("DFA"), and Application Centric Infrastructure ("ACI").

A source host device within a first Layer 2 network fabric creates a Layer 2 frame to be transmitted to a destination host device within a second Layer 2 network fabric. The first Layer 2 network fabric and the second Layer 2 network fabric have the same subnet address but are located at separate sites.

The source host device transmits the Layer 2 frame to a fabric edge node within the first Layer 2 network fabric. The fabric edge node encapsulates the Layer 2 frame with a Virtual eXtensible Local Area Network ("VXLAN") header and transmits the VXLAN encapsulated frame to a fabric border node within the first Layer 2 network fabric.

The fabric border node decapsulates the VXLAN encapsulated frame to determine the subnet destination identifier ("ID") and the subnet source ID. The fabric border node determines if the destination ID matches the source ID. If the destination ID does not match the source ID, the fabric border node accesses a route from a VPN virtual private network routing and forwarding ("VRF") table and forwards the encapsulated frame to the destination host device.

If the destination ID matches the source ID, the fabric border node determines if the destination ID is a Layer 2 VPN. If the destination ID is a Layer 2 VPN, the fabric border node transmits an address request protocol ("ARP") across the Layer 2 VPN, and does not receive a reply because the address is not located within the first Layer 2 network fabric.

After the fabric border node transmits an ARP across the Layer 2 VPN and does not receive a reply, the fabric border node transmits a map request in a Layer 3 VXLAN network identifier ("VNI") to a Layer 3 transit fabric. A transit control plane node within the Layer 3 transit fabric receives the map request.

The transit control plane extracts a VNI from the map request. The transit control plane node determines whether the VNI is a Layer 2 VNI, a Layer 3 VNI, or if the VNI is not recognized. If the transit control plane node determines that the VNI is a Layer 3 VNI, the transit control plane node stores a mapping associated with the Layer 3 VNI in Layer 3 cache and returns that information to the fabric border node in the first Layer 2 network fabric. If the transit control plane node determines that the VNI is neither a Layer 2 or Layer 3 VNI, the transit control plane node generates and stores a negative map reply in Layer 2 and Layer 3 cache and returns that information to the fabric border node in the first Layer 2 network fabric.

If the transit control plane node determines that the VNI is a Layer 2 VNI, the transit control plane node generates and stores a mapping associated with the Layer 2 VNI in Layer 2 cache. The transit control plane node transmits a map reply to the fabric border node within the first Layer 2 network fabric. The fabric border node re-encapsulates the Layer 2 frame using the mapping and forwards the encapsulated frame to the Layer 2 VNI, which is the second Layer 2 network fabric.

A fabric border node within the second Layer 2 network fabric receives the encapsulated frame, decapsulates the encapsulated frame, and extracts a destination media access control ("MAC") address associated with a destination host device from the Layer 2 frame. The fabric border node forwards the encapsulated frame to a fabric edge node associated with the destination MAC address. The fabric edge node decapsulates the encapsulated frame and forwards the Layer 2 frame to the destination MAC address.

The present technology allows normalized lookup and forwarding for diverse Virtual Private Networks ("VPNs"). This technology allows Layer 2 services to be delivered within a site and Layer 3 services across sites in a multi-site network. Separate Layer 2 sites within a same subnet can forward network traffic without a Layer 2 VNI between the sites. This technology enables automated forwarding and lookup in multi-site fabrics without the need for manual configuration.

These and other aspects, objects, features, and advantages of the disclosed technology will become apparent to those having ordinary skill in the art upon consideration of the following detailed description of illustrated examples.

Example System Architecture

Turning now to the drawings, in which like numerals indicate like (but not necessarily identical) elements throughout the figures, examples of the technology are described in detail.

FIG. 1 is a block diagram depicting a multi-site network fabric system 100, in accordance with certain examples. While each server, system, and device shown in the architecture is represented by one instance of the server, system, or device, multiple instances of each can be used. As depicted in FIG. 1, the multi-site network fabric system 100 comprises a transit fabric 110, a network fabric 120, and a network fabric 130.

The transit fabric 110 is a network fabric configured to extend the example network fabrics 120 and 130 without extending the associated network virtual network identifier ("VNI"). The transit fabric 110 may be used for inter-site communications. The transit fabric 110 may connect multiple types of sites, including software defined access ("SD-Access") sites such as Location ID Separation Protocol ("LISP"), Virtual eXtensible Local Area Network ("VXLAN"), Cisco TrustSec ("CTS"), and Internet Protocol ("IP") based sites such as Virtual Private Network Routing and Forwarding Lite ("VRF-LITE"), and Multiprotocol Label Switching ("MPLS").

In an example, the transit fabric 110 is a Layer 3 network fabric. Layer 3 in the Open Systems Interconnection ("OSI") model is the network layer. A Layer 3 network fabric functions to transfer variable-length network packets or frames from a source to a destination host via one or more network fabrics. Layer 3 network fabrics use border gateway protocol ("BGP") as the control plane node protocol to advertise prefixes, perform traffic engineering, and tag traffic. A Layer 3 network fabric utilizes both a media access control ("MAC") address table and an IP address table, and handles communication and packet routing between different virtual private networks ("VPNs").

The transit fabric 110 comprises a domain-wide transit control plane node 111. The transit control plane node 111 comprises one or more computing devices functioning to track endpoints in a network fabric and to associate the endpoints to fabric nodes. The transit control plane node 111 enables functions such as a host trackable database ("HTDB"), map server, and map resolver. The HTDB is a central storage of endpoint identifier ("EID") to fabric edge node bindings. The HTDB supports multiple types of EID lookups keys, such as Internet Protocol Version 4 ("IPv4"), Internet Protocol Version 6 ("IPv6"), or MAC. The map server functions to populate the HTDB. The map resolver responds to map queries from fabric border nodes, such as fabric border nodes 122 and 132.

The multi-site network fabric system 100 comprises network fabrics 120 and 130. While network fabrics 120 and 130 are shown in the architecture as represented by one instance of each of network fabrics 120 and 130, multiple instances of each can be used and additional network fabrics can be utilized. In an example, each network fabric 120 and network fabric 130 are Layer 2 network fabrics. Layer 2 in the OSI model is the data link layer and provides services such as framing network layer data packets, flow control, multiple access control, physical addressing, switching, quality of service ("QoS"), and virtual local area networks ("VLAN"). Traditional switching operates at Layer 2, where packets are sent to a specific switch port based on destination MAC addresses. Layer 2 network fabrics comprise devices that can only communicate within the same network. In an example and as depicted in FIG. 1, network fabrics 120 and 130 are distinct and separate network sites.

Network fabric 120 comprises control plane node 121, fabric border node 122, fabric edge nodes 123-1 through 123-n, and host devices 124-1 through 124-n. The control plane node 121 comprises one or more computing devices functioning to track endpoints in a network fabric and to associate the endpoints to fabric nodes. The control plane node 121 enables functions such as the HTDB, map server, and map resolver. The HTDB is a central storage of EID to fabric edge node bindings. The control plane node 121 receives EID map registrations from fabric edge nodes, such as fabric edge nodes 123-1 through 123-n. The map server functions to populate the HTDB. The map resolver responds to map queries from fabric edge devices, such as fabric edge nodes 123-1 through 123-n.

The network fabric 120 comprises fabric border node 122. While fabric border node 122 is shown in the architecture as represented by one instance of fabric border node 122, multiple instances can be used. Each fabric border node 122 may comprise one or more computing devices.

The fabric border node 122 serves as a gateway between the network fabric 120 and other network fabrics, such as transit fabric 110 and network fabric 130. The fabric border node 122 functions as an entry and exit point for data going into and out of the network fabric 120. There are three types of fabric border node 122: internal, external, and combination internal/external. If the fabric border node 122 is configured to be internal to the network fabric 120, the fabric border node 122 is used for known routes within the network fabric 120 and operates as a gateway for specific network addresses. If the fabric border node 122 is configured to be external to the network fabric 120, the fabric border node 122 is used for unknown routes external to the network fabric 120 and operates as a default exit point. The fabric border node 122 may also be configured as a combination internal/external node. The combination internal/external fabric border node 122 may be used for both known and unknown routes.

The fabric border node 122 implements the function of advertisement of EID subnets with traffic destined for EID subnets coming in from outside the network fabric 120 through the fabric border node 122. The fabric border node 122 functions to extend network virtualization from inside the network fabric 120 to outside the network fabric 120 using external virtual routing and forwarding ("VRF") instances with VRF aware routing protocols. The fabric border node 122 serves as a fabric domain exit point for fabric edge nodes 123-1 through 123-n. The fabric border node 122 also maps security information from within the network fabric 120, such that the security information is maintained when exiting the network fabric 120.

Figure 2:
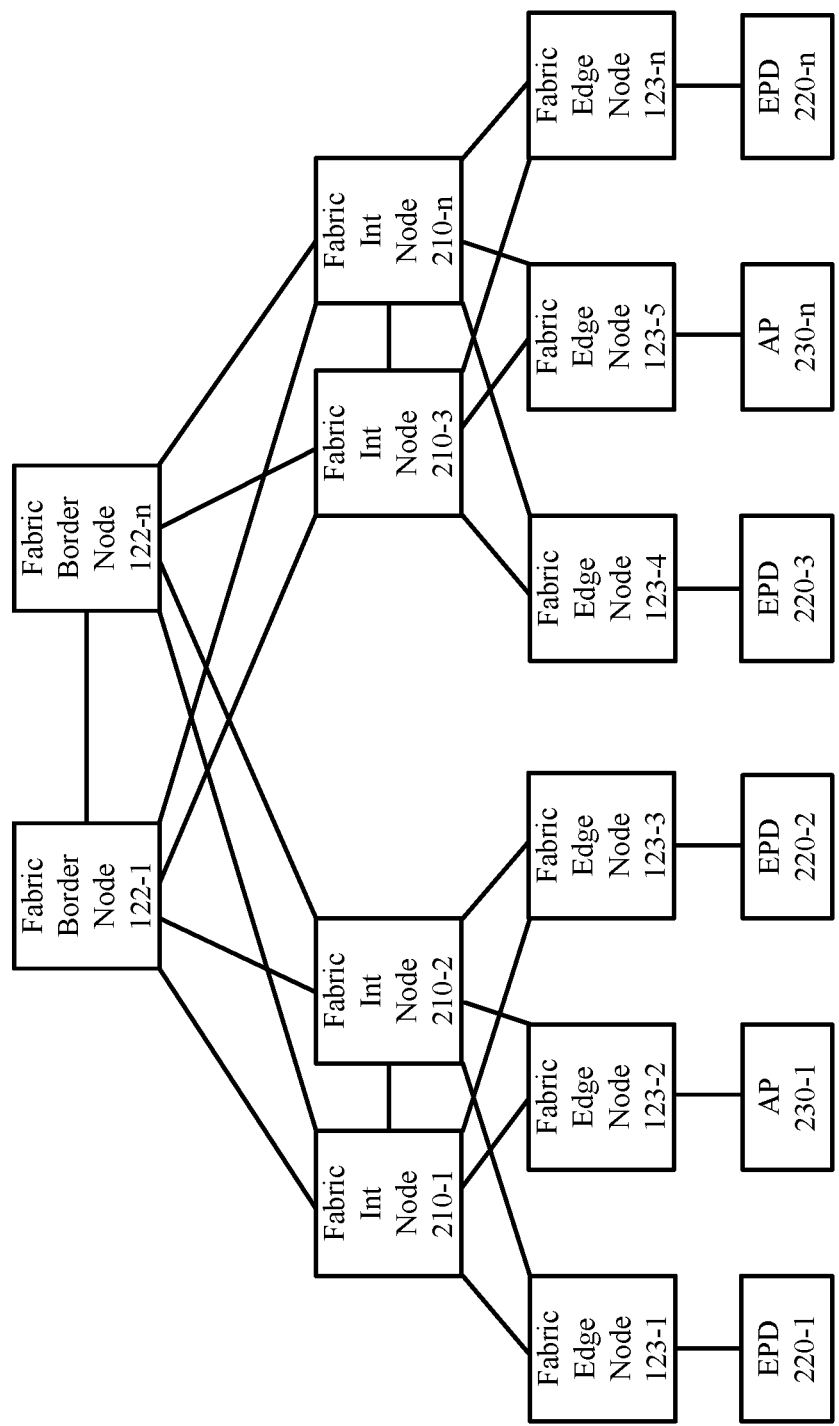
FIG. 2 is a block diagram depicting a network fabric system, in accordance with certain examples.

The network fabric 120 comprises fabric edge nodes 123-1 through 123-n. Each fabric edge node 123 may comprise one or more computing devices. The number of fabric edge nodes 123 may vary based on the number of end point devices ("EPDs") 220 and access points ("APs") 230 in a particular network fabric, as illustrated in FIG. 2, or based on any other suitable factors.

The fabric edge nodes 123 are fabric devices that allow access to, or distribution within, the network fabric 120. The fabric edge nodes 123 are responsible for identifying and authenticating fabric endpoints, for example, static, 802.1X, and active directory. The fabric edge nodes 123 are responsible for endpoint registration, for example, /32 or /128, with a control plane node, such as control plane node 121. As EPDs 220 are connected or detected by the fabric edge nodes 123, EID information associated with each EPD 220 is added to a HTDB local to each fabric edge node 123. The EID information may be stored in the local HTDB in an EID-table. Each fabric edge node 123 transmits the data stored in the local HTDB to a control plane node, such as control plane node 121, to populate the HTDB of the control plane node. The fabric edge nodes 123 identify and authenticate the EPDs 220 and the APs 230, and admit, encapsulate/decapsulate, and forward traffic to and from the EPDs 220 and the APs 230 connected to the network fabric 120 edge.

Traffic between the fabric edge nodes 123 and the fabric border node 122 is encapsulated in VXLAN headers or other suitable headers. In the example where network fabric 120 is a Layer 2 network fabric, EPDs 220 may use the same MAC address that is within the encapsulation and may move between the different fabric edge nodes 123.

The network fabric 120 comprises one or more host devices 124-1 through 124-n. A host device 124 is a computer or other device that is connected to network fabric 120 via a wired or wireless telecommunication mechanism. A host device 124 may function as a server offering information resources, services, and applications to other users or hosts in network fabric 120, or users or hosts external to network fabric 120, such as network fabric 130. Each host device 124 may be in communication with a fabric edge node 123 via a wired or wireless telecommunication mechanism.

Network fabric 130 comprises control plane node 131, fabric border node 132, fabric edge nodes 133-1 through 133-n, and host devices 134-1 through 134-n. As depicted in FIG. 1, network fabric 130 is a component of multi-site network fabric system 100 that resides on a separate site from network fabric 120. The components of network fabric 130, control plane node 131, fabric border node 132, fabric edge nodes 133-1 through 133-n, and host devices 134-1 through 134-n, serve to function in a similar manner as their counterpart components previously described with respect to network fabric 120, control plane node 121, fabric border node 122, fabric edge nodes 123-1 through 123-n, and host devices 124-1 through 124-n, respectively. Each fabric edge node 133 may be in communication with one or more host devices, such as host devices 134-1 through 134-n, as previously described with respect to fabric edge node 123.

Each multi-site network fabric system 100 includes a wired or wireless telecommunication mechanism by which network devices (including fabrics 110, 120, and 130, and devices 111, 121, 122, 123, 124, 131, 132, 133, and 134) can communicate and exchange data. Each multi-site network fabric system 100 can include, be implemented as, or may be a part of, a wired or wireless communication network, cloud computing environment, or any other appropriate architecture or system that facilitates the communication of signals, data, and/or messages (generally referred to as data). For example, multi-site network fabric system 100 may include one or more of a local area network ("LAN"), a wide area network ("WAN"), an intranet, an Internet, a storage area network ("SAN"), a personal area network ("PAN"), a metropolitan area network ("MAN"), a wireless local area network ("WLAN"), a virtual private network ("VPN"), a cellular or other mobile communication network, a BLUETOOTH® wireless technology connection, a near field communication ("NFC") connection, any combination thereof, and any other appropriate architecture or system that facilitates the communication of signals, data, and/or messages. Throughout the discussion of example embodiments, it should be understood that the terms "data" and "information" are used interchangeably herein to refer to text, images, audio, video, or any other form of information that can exist in a computer-based environment.

FIG. 2 is a block diagram depicting a network fabric system 200, in accordance with certain examples. As depicted in FIG. 2, the network fabric system 200 comprises fabric border nodes 122, fabric intermediate nodes 210, fabric edge nodes 123, EPDs 220, and APs 230. Fabric border nodes 122 and fabric edge nodes 123 were previously described with reference to FIG. 1.

The network fabric system 200 comprises fabric intermediate nodes 210-1 through 210-n. Each fabric intermediate node 210 may comprise one or more computing devices. While FIG. 2 depicts four fabric intermediate nodes 210, the number of fabric intermediate nodes 210 may vary based on the number of EPDs 220 and APs 230 in a particular network fabric.

The fabric intermediate nodes 210 may be part of a Layer 2 network used for interconnections between the fabric border nodes 122 and the fabric edge nodes 123. The fabric intermediate nodes 210 are the equivalent of distribution switches and route and transport traffic inside the network fabric system 200. The fabric intermediate nodes 210 have a maximum transmission unit ("MTU") requirement to accommodate larger-size packets encapsulated with VXLAN information.

The network fabric system 200 comprises EPDs 220-1 through 220-n. While FIG. 2 depicts four EPDs 220, the number of EPDs 220 may vary based on a particular network fabric 200 configuration with a large deployment, such as a deployment ranging up to 50,000 EPDs 220 or more.

While EPDs 220-1 through 220-n are depicted as similar devices in FIG. 2, each EPD 220 may be one of numerous different types of computing devices. Each EPD 220 may include either a wired or wireless telecommunication mechanism by which the EPD 220 can communicate and exchange data. Each EPD 220 may be a server, personal computer, mobile device (for example, notebook computer, handheld computer, tablet computer, netbook computer, personal digital assistant ("PDA"), video game device, GPS locator device, cellular telephone, Smartphone, or other mobile device), a television with one or more processors embedded therein and/or coupled thereto, Internet-of-things ("IoT") devices, or other appropriate technology that comprises or is coupled to a web browser or other application for communicating via the network fabric system 200.

The network fabric system 200 comprises APs 230-1 through 230-n. While FIG. 2 depicts two APs 230, the number of APs 230 may vary based on a particular network fabric system 200 with a large deployment comprising up to 2,000 APs 230 or more.

While APs 230-1 through 230-n are depicted as similar devices in FIG. 2, each AP 230 may be one of numerous different types of network hardware devices. Each AP 230 may include one or more radios to send and receive wireless radio signals. Each radio may have an internal antenna or both an internal and external antenna. The 802.11 standard designates the radio frequencies used by each AP 230. Each AP 230 may connect to a router (not depicted in FIG. 2) or may be a component of the router itself.

Each AP 230 applies wireless media specific features. For example, each AP 230 applies radio and service set identifier ("SSID") policies, security policies, and peer-to-peer blocking policies. Each AP 230 may convert 802.11 traffic and forward the traffic with VXLAN encapsulation or other suitable encapsulation.

Each network fabric system 200 includes a wired or wireless telecommunication mechanism by which system devices (including devices 122, 123, 210, 220, and 230) can communicate and exchange data. Each network fabric system 200 can include, be implemented as, or may be a part of a wired or wireless communication network, cloud computing environment, or any other appropriate architecture or system that facilitates the communication of signals, data, and/or messages (generally referred to as data). For example, network fabric system 200 may include one or more of a LAN, a WAN, an intranet, an Internet, a SAN, a PAN, a MAN, a WLAN, a VPN, a cellular or other mobile communication network, a BLUETOOTH® wireless technology connection, an NFC connection, any combination thereof, and any other appropriate architecture or system that facilitates the communication of signals, data, and/or messages. Throughout the discussion of example embodiments, it should be understood that the terms "data" and "information" are used interchangeably herein to refer to text, images, audio, video, or any other form of information that can exist in a computer-based environment.

Figure 3:
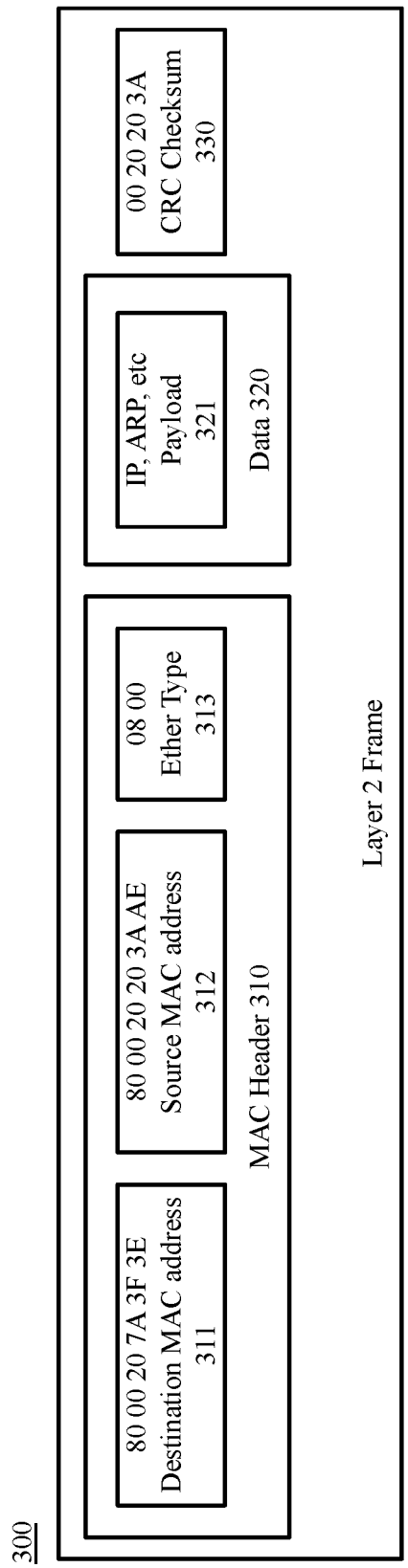
FIG. 3 is a block diagram depicting a Layer 2 frame, in accordance with certain examples.

FIG. 3 is a block diagram depicting a Layer 2 frame 300, in accordance with certain examples. The Layer 2 frame 300 may be referred to as a packet or a protocol data unit ("PDU"). The Layer 2 frame 300 comprises a MAC header 310, data 320, and cyclic redundancy check ("CRC") checksum 330. In an example, the Layer 2 frame 300 is generated by a host device associated with a network fabric, such as host device 124 with network fabric 120 or host device 134 with network fabric 130. The Layer 2 frame starts with MAC header 310. The MAC header 310 comprises a destination MAC address 311, a source MAC address 312, and an Ether Type 313.

The destination MAC address 311 is a MAC address associated with a device to which the Layer 2 frame 300 is to be delivered. The source MAC address 312 is the MAC address associated with a device generating the Layer 2 frame 300.

The Ether Type 313 is a field in an Ethernet frame that indicates which protocol is used to encapsulate the payload of the frame, for example, the protocol of payload 321 of Layer 2 frame 300. Example Ether Types 313 include an IPv4 datagram, an address request protocol ("ARP") frame, an IPv6 frame, or an IEEE 802.1Q tag.

The Layer 2 frame 300 comprises data 320 as a middle section with payload 321 data to be transferred to the destination MAC address 311. The Layer 2 frame 300 may end with a frame check sequence CRC checksum 330, which, for example, is a 32-bit cycle redundancy check used to detect possible in-transit corruption of data.

Figure 4:
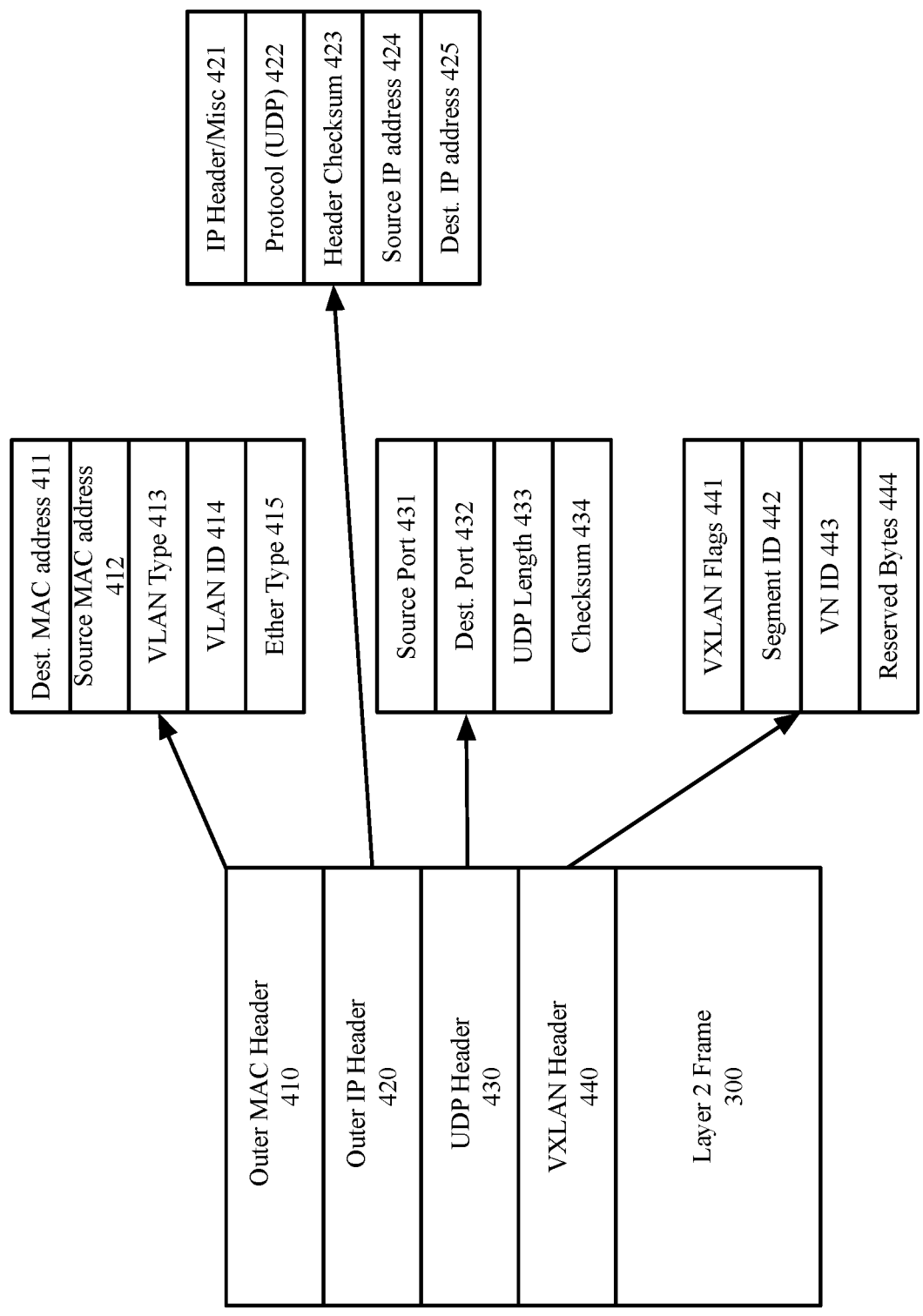
FIG. 4 is a block diagram depicting a Virtual eXtensible Local Area Network ("VXLAN") encapsulated Layer 2 frame, in accordance with certain examples.

FIG. 4 is a block diagram depicting a VXLAN encapsulated Layer 2 frame 400, in accordance with certain examples. The VXLAN encapsulated Layer 2 frame 400 comprises outer MAC header 410, outer IP header 420, user data protocol ("UDP") header 430, VXLAN header 440, and Layer 2 frame 300 (previously described in reference to FIG. 3). Encapsulation is the process of placing headers and sometimes trailers around data. In an example, the data is the Layer 2 frame 300.

The outer MAC header 410 comprises destination MAC address 411, source MAC address 412, VLAN type 413, VLAN identification ("ID") 414, and Ether Type 415. The destination MAC address 411 is the next-hop MAC address. The source MAC address 412 is the source VXLAN tunnel end point ("VTEP") MAC address. The VTEP is the end point that is responsible for encapsulating the Layer 2 frame, for example, the Layer 2 frame 300.

The VLAN type 413 may be a management VLAN, a data VLAN, a voice VLAN, a default VLAN, a native VLAN, or any other suitable type of VLAN. The VLAN type 413 is identified based on the VLAN ID 414. The VLAN ID 414 is an identification number, typically between 0-4095. In an example, if the VLAN type 413 is a default VLAN, the VLAN ID 414 may be VLAN 1. The Ether Type 415 is a field in an Ethernet frame that indicates which protocol is encapsulated in the payload of the frame. Example Ether Types 415 include an IPv4 datagram, an ARP frame, an IPv6 frame, or an IEEE 802.1Q tag.

The outer IP header 420 comprises IP header/miscellaneous 421, protocol (UDP) 422, header checksum 423, source IP address 424, and destination IP address 425. The IP header/miscellaneous 421 comprises information used by the forwarding protocol, for example, protocol (UPD) 422, to determine the next node. The IP header/miscellaneous 421 may also comprise miscellaneous data associated with route information.

The protocol (UPD) 422 is an 8-bit field with a protocol number used to identify the protocol. Example protocol numbers may include any protocol number managed and assigned by the Internet Assigned Numbers Authority ("IANA"). An example protocol number may be 0x11, which would indicate UDP.

The header checksum 423 is, for example, a 32-bit cycle redundancy check used to detect possible in-transit corruption of data. The source IP address 424 is the IP address of the VTEP that originated the Layer 2 frame 300, for example, the source MAC address 312. The destination IP address 425 is the VTEP to which the Layer 2 frame 300 is to be delivered, for example, the destination MAC address 311.

The UDP header 430 comprises source port 431, destination port 432, UPD length 433, and checksum 434. The source port 431 indicates the port of the transmission process, and may be the port to which a reply is addressed in the absence of additional information. The destination port 432 is the port of the device receiving the data, for example, the payload 321 of the Layer 2 frame 300.

The UPD length 433 is a field that specifies the length in bytes of the UPD header 430 and the UDP data. In an example, the minimum length of the UPD length 433 is 8 bytes. The checksum 434 is, for example, a 32-bit cycle redundancy check used to detect possible in-transit corruption of data.

The VXLAN header 440 comprises VXLAN flags 441, segment ID 442, a virtual network ("VN") ID 443, and reserved bytes 444. The VXLAN flags 441 is, for example, an 8-bit field within the VXLAN header 440. In an example, one field of the 8-bit field is designated for an individual ("I") VXLAN network. The bit value is set to "1" to indicate that the VXLAN header 440 comprises a valid VXLAN ID. The remaining 7 bits of the 8-bit field are reserved ("R"), with the bit value set to "0."

The segment ID 442 is an identifier associated with segment routing. With segment routing, a path from a source to a destination is encoded in a header as an ordered list of segments. Each segment is identified by a segment ID 442, which comprises a 32-bit integer. The VN ID 443 is a VXLAN network identifier ("VNI"), which defines the VXLAN broadcast domain. The reserved bytes 444 are bytes reserved for additional features that may be incorporated in future deployments.

Figure 9:
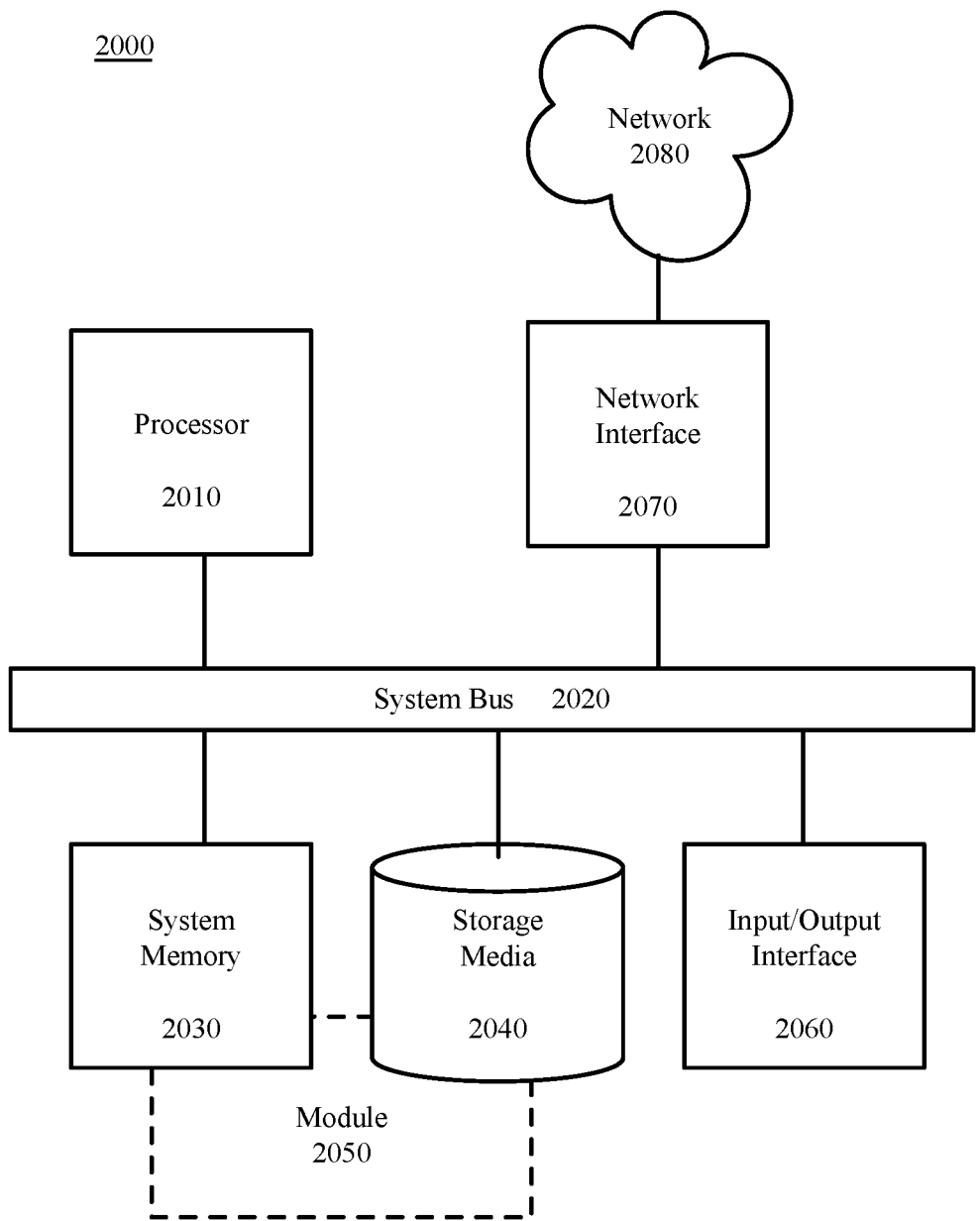
FIG. 9 is a block diagram depicting a computing machine and a module, in accordance with certain examples.

The network computing devices and any other computing machines associated with the technology presented herein may be any type of computing machine, such as, but not limited to, those discussed in more detail with respect to FIG. 9. For example, each device can include a server, a desktop computer, a laptop computer, a tablet computer, a television with one or more processors embedded therein and/or coupled thereto, a smart phone, a handheld computer, a PDA, a router, a switch, a hub, a gateway, a modem, an access point, a bridge, or any other wired or wireless processor-driven device. The computing machines discussed herein may communicate with one another, as well as with other computing machines or communication systems over one or more networks. Each network may include various types of data or communications networks, including any of the network technology discussed with respect to FIG. 9.

Furthermore, any modules associated with any of these computing machines, such as modules described herein or any other modules (scripts, web content, software, firmware, or hardware) associated with the technology presented herein may be any of the modules discussed in more detail with respect to FIG. 9.

The network connections illustrated are examples and other means of establishing a communications link between the computers and devices can be used. Moreover, those having ordinary skill in the art having the benefit of the present disclosure will appreciate that the devices illustrated in FIGS. 1-4 may have any of several other suitable computer system configurations.

Example Processes

The methods illustrated in FIGS. 5-8 are described hereinafter with respect to the components of the multi-site network fabric system 100, the network fabric system 200, the Layer 2 frame 300, and the Virtual eXtensible Local Area Network ("VXLAN") encapsulated Layer 2 frame 400. The methods of FIGS. 5-8 may also be performed with other systems and in other environments. The operations described with respect to FIGS. 5-8 can be implemented as executable code stored on a computer or machine readable non-transitory tangible storage medium (e.g., floppy disk, hard disk, ROM, EEPROM, nonvolatile RAM, CD-ROM, etc.) that are completed based on execution of the code by a processor circuit implemented using one or more integrated circuits; the operations described herein also can be implemented as executable logic that is encoded in one or more non-transitory tangible media for execution (e.g., programmable logic arrays or devices, field programmable gate arrays, programmable array logic, application specific integrated circuits, etc.).

The methods of FIGS. 5-8 describe routing a Layer 2 frame 300 from a host device 124 in network fabric 120, across transit fabric 110, to a destination host device 134 in network fabric 130. The methods of FIGS. 5-8 may also be implemented from a host device 124 in network fabric 120, across alternate transit fabrics, or to a destination host device in alternate network fabrics, not depicted in FIG. 1. The methods of FIGS. 5-8 may also be implemented from a host device 134 in network fabric 130, across transit fabric 110, to a destination host device 124 in network fabric 120 or another network fabric.

Figure 5:
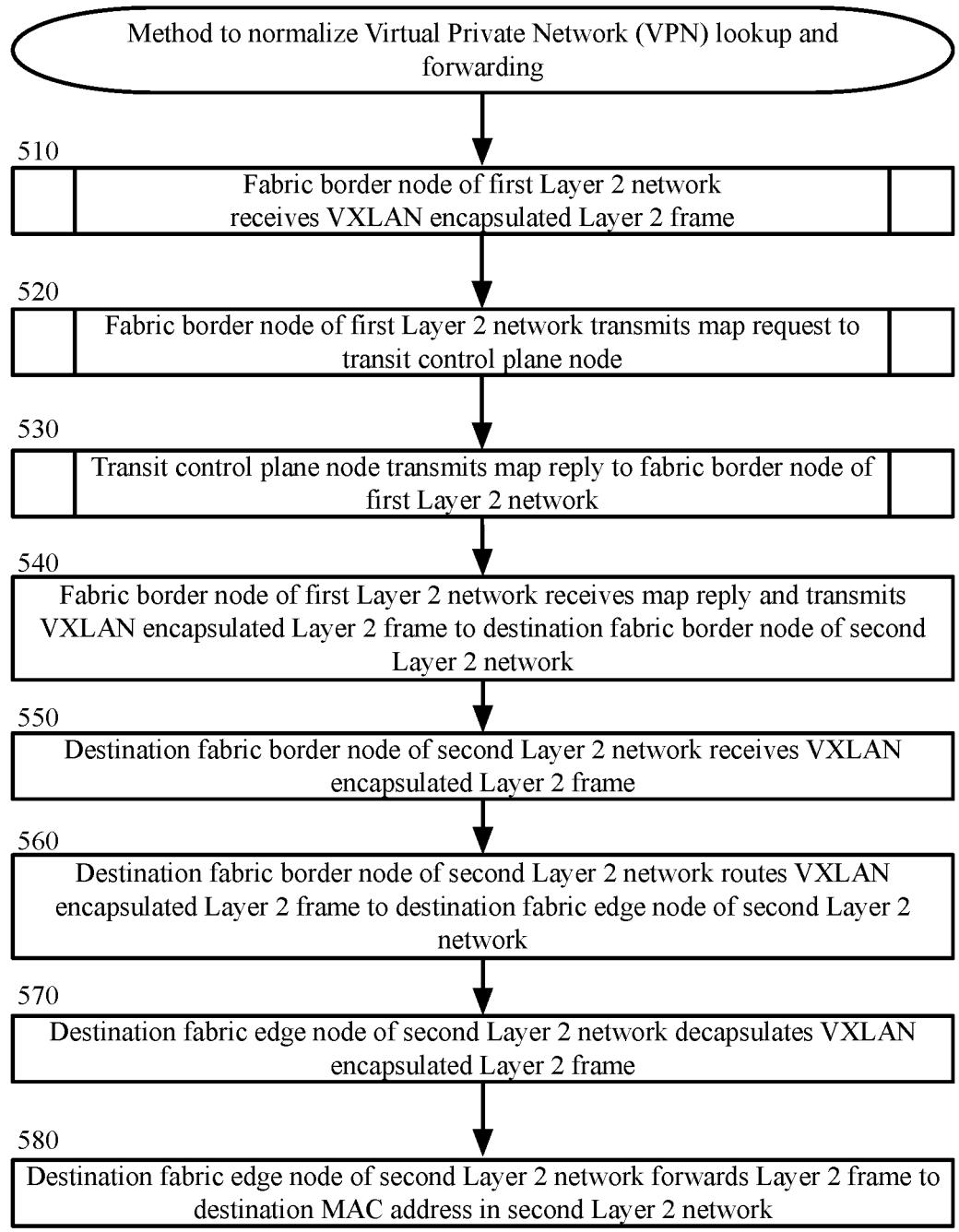
FIG. 5 is a block flow diagram depicting a method to normalize Virtual Private Network ("VPN") lookup and forwarding, in accordance with certain examples.

FIG. 5 is a block flow diagram depicting a method 500 to normalize Virtual Private Network ("VPN") lookup and forwarding, in accordance with certain examples.

In block 510, fabric border node 122 receives a VXLAN encapsulated Layer 2 frame 400, in accordance with certain examples. Block 510 is described in greater detail herein with reference to the method 510 of FIG. 6.

Figure 6:
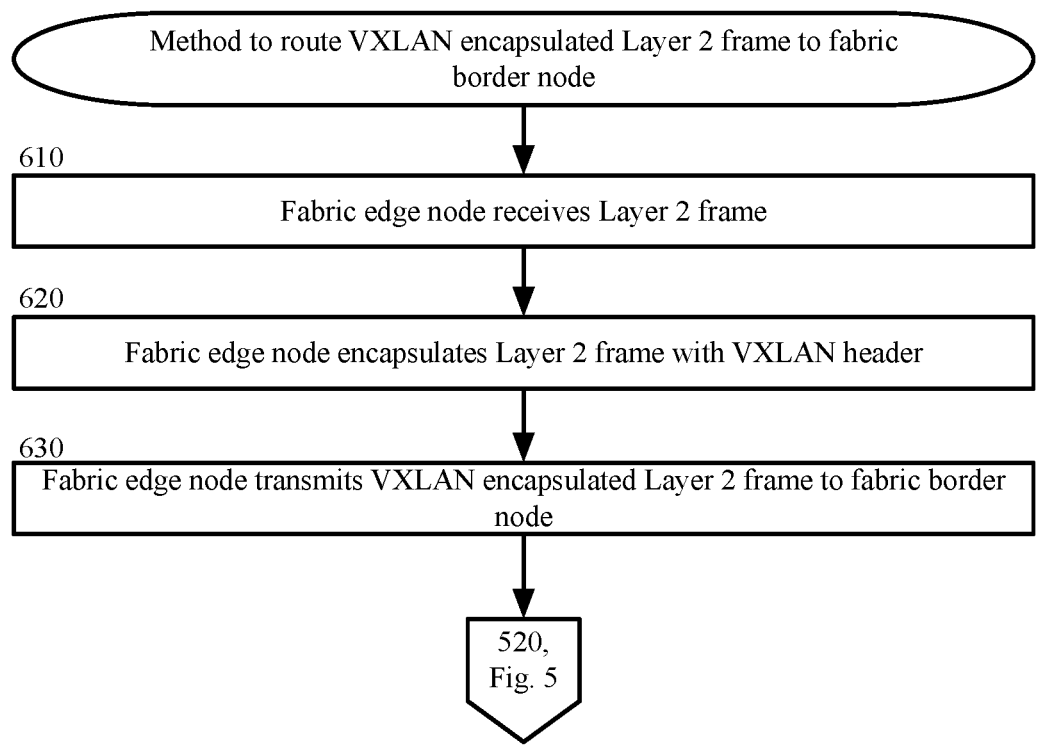
FIG. 6 is a block flow diagram depicting a method to route a VXLAN encapsulated Layer 2 frame to a fabric border node, in accordance with certain examples.

FIG. 6 is a block flow diagram depicting a method 510 to route a VXLAN encapsulated Layer 2 frame 400 to a fabric border node 122, in accordance with certain examples.

In block 610, fabric edge node 123 receives a Layer 2 frame 300. In an example, the fabric edge node may be any of fabric edge nodes 123-1 through 123-n in network fabric 120. In an example, the Layer 2 frame 300 is transmitted to the fabric edge node 123 from a host device 124 associated with the fabric edge node 123.

The Layer 2 frame 300 comprises a destination MAC address 311 and a source MAC address 312, as depicted in FIG. 3. In an example, the source MAC address 312 is associated with a host device 124 in network fabric 120, and the destination MAC address 311 is associated with a host device 134 in network fabric 130. In an example and as depicted in FIG. 1, network fabric 120 and network fabric 130 are distinct and separate network sites. In the example, network fabric 120 and network fabric 130 are Layer 2 network fabrics with the same subnet address.

In block 620, the fabric edge node 123 encapsulates the Layer 2 frame 300 with a VXLAN header, as depicted in FIG. 4. As described in reference to FIG. 4, encapsulation is the process of placing headers and sometimes trailers around data, such as the Layer 2 frame 300.

In block 630, the fabric edge node 123 transmits the VXLAN encapsulated Layer 2 frame 400 to the fabric border node 122. The VXLAN encapsulated Layer 2 frame 400 may be transmitted from the fabric edge node 123 via one or more fabric interior nodes 210 to the fabric border node 122. In an example, the fabric border node may be any of fabric border nodes 122-1 through 122-n.

From block 630, the method 510 returns to block 520 of FIG. 5.

In block 520, the fabric border node 122 transmits a map request to the transit control plane node 111. Block 520 is described in greater detail herein with reference to the method 520 of FIG. 7.

Figure 7:
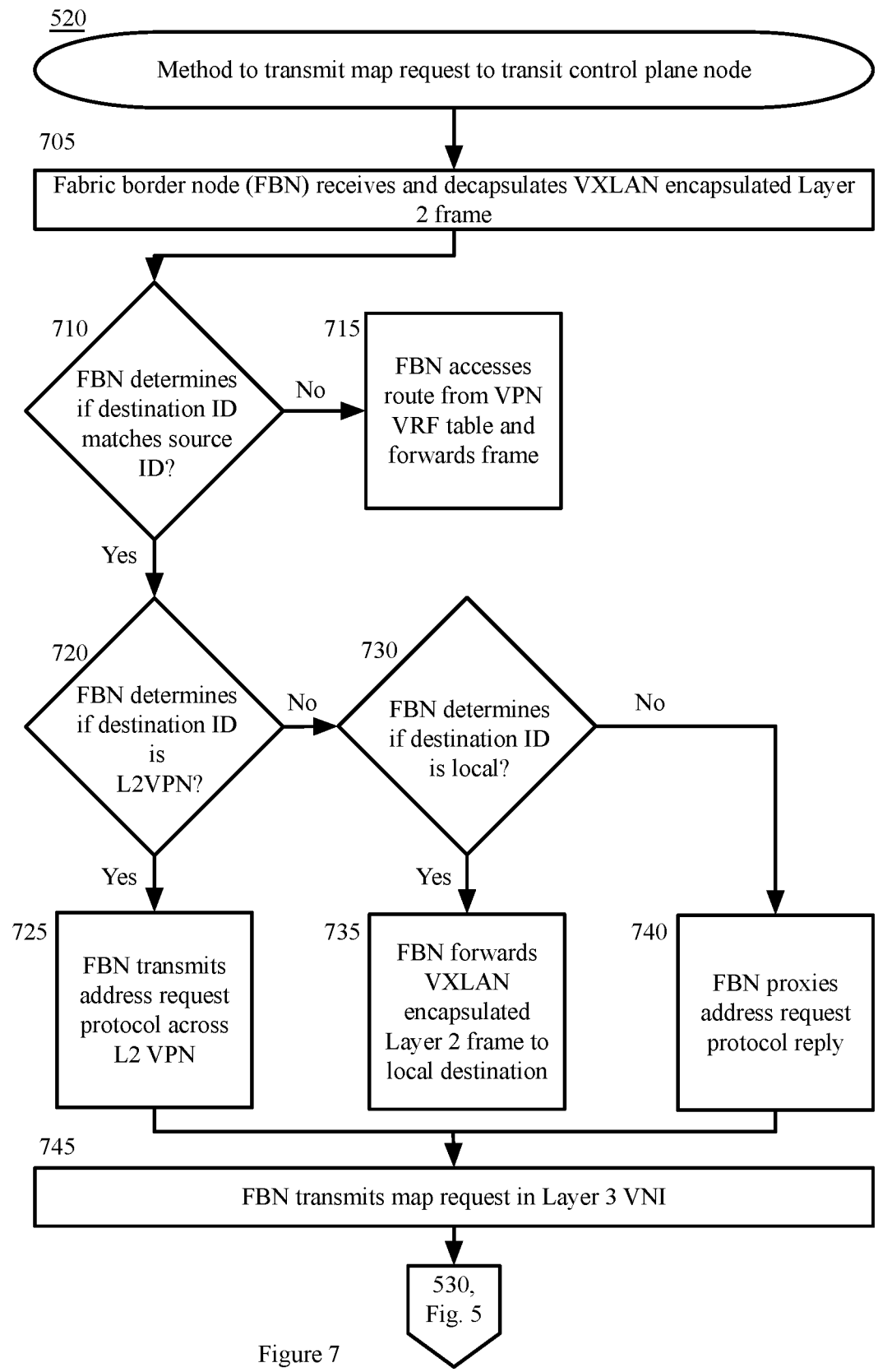
FIG. 7 is a block flow diagram depicting a method to transmit a map request to a transit control plane node, in accordance with certain examples.
Figure 8:
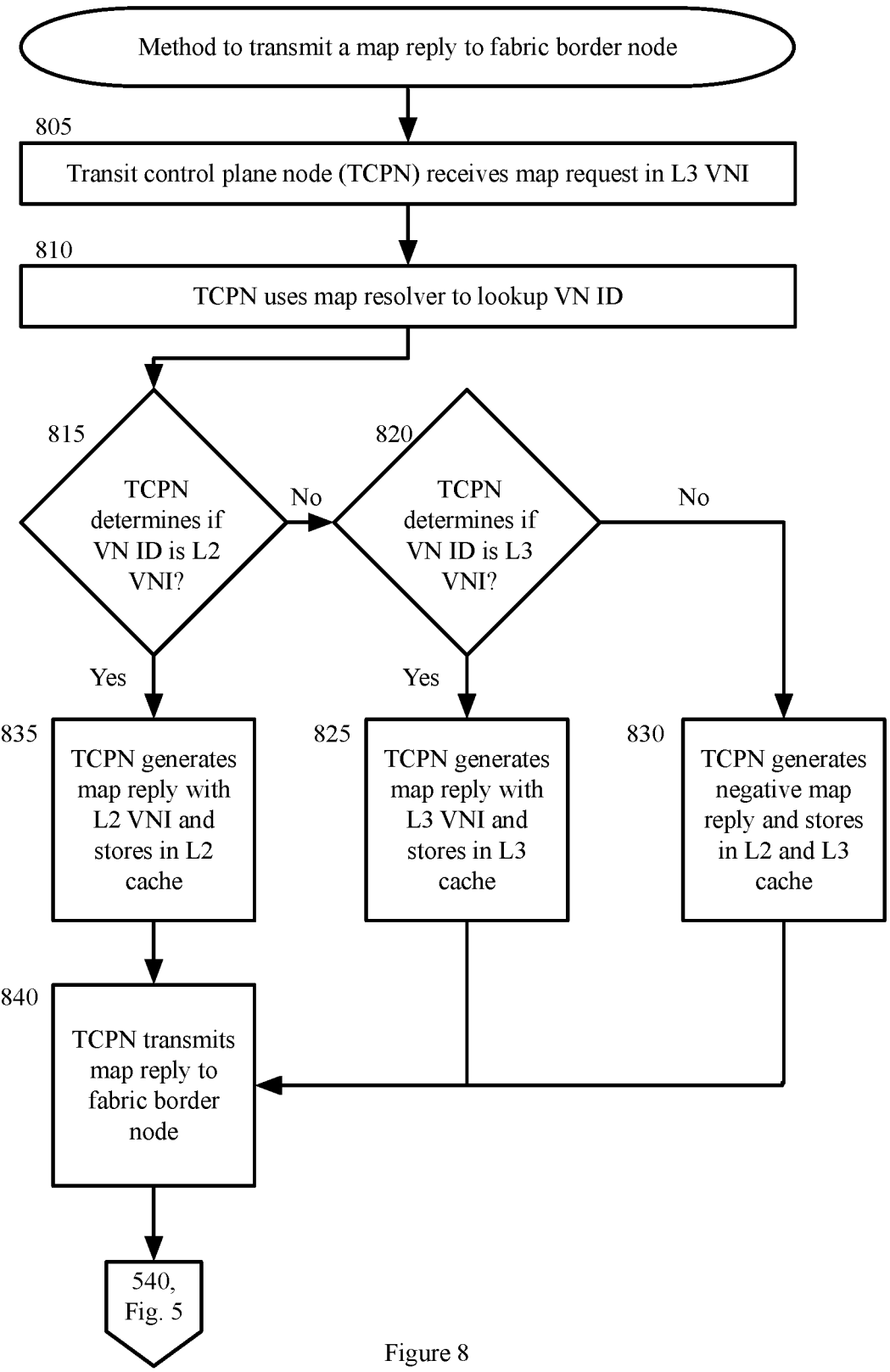
FIG. 8 is a block flow diagram depicting a method to transmit a map reply to a fabric border node, in accordance with certain examples.

FIG. 7 depicts a method 520 to transmit a map request to the transit control plane node 111, in accordance with certain examples.

In block 705, the fabric border node 122 receives the VXLAN encapsulated Layer 2 frame 400 from the fabric edge node 123 and decapsulates the VXLAN encapsulated Layer 2 frame 400. The fabric border node 122 extracts a destination network identifier and a source network identifier from the decapsulated VXLAN encapsulated Layer 2 frame 400. In an example, the fabric border node 122 extracts the destination network identifier and the source network identifier from the outer IP header 420 of the decapsulated VXLAN encapsulated Layer 2 frame 400. The fabric border node 122 extracts source IP address 424 and the destination IP address 425. In an example, the source IP address 124 may be 10.1.0.0/16 and may be the IP address associated with network fabric 120. The destination IP address 425 may be 10.1.0.0/16 and may be the IP address associated with network fabric 130.

In block 710, the fabric border node 122 determines if the destination network ID matches the source network ID extracted in block 705. The fabric border node 122 compares the source IP address 424 to the destination IP address 425. Continuing with the previous example, the source IP address 424 matches the destination IP address 425 of 10.1.0.0/16. If the destination network ID does not match the source network ID, the method proceeds to block 715.

In block 715, the fabric border node 122 accesses a route from the source network ID to the destination network ID from a virtual private network ("VPN") VPN routing and forwarding table ("VRF") and forwards the VXLAN encapsulated Layer 2 frame 400 to a fabric edge node 123 associated with the destination MAC address 311. In an example, the VPN VRF table may be stored in a memory associated with the fabric border node 122. In an alternate example, the fabric border node 122 may transmit a request to control plane node 121 to provide the routing from the source network ID to the destination network ID. The fabric border node 122 forwards the VXLAN encapsulated Layer 2 frame 400 to the fabric edge node 123 associated with the destination MAC address 311 via the route from the VPN VRF table. The fabric edge node 123 decapsulates the packet and forwards the Layer 2 frame 300 to the destination MAC address 311.

Returning to block 710, if the fabric border node 122 determines that the destination network ID matches the source network ID, the method 520 proceeds to block 720.

In block 720, the fabric border node 122 determines if the destination network ID is a Layer 2 VPN. In an example, the fabric border node 122 is configured to use Border Gateway Protocol ("BGP") to exchange routing and reachability information between network fabrics. The fabric border node 122 may be configured to use BGP as a signaling protocol to discover Layer 2 VPNs. If the fabric border node 122 determines that the destination network ID is a Layer 2 VPN, the method 520 proceeds to block 725.

In block 725, the fabric border node 122 transmits an address request protocol ("ARP") request across the Layer 2 VPN. In an example, the ARP is flooded across the Layer 2 VPN. Flooding is the process of transmitting the VXLAN encapsulated Layer 2 frame 400 to all ports within the network fabric 120. The fabric border node 122 extracts a Layer 2 VNI from the VXLAN encapsulated Layer 2 frame 400. The VXLAN header 440 comprises the Layer 2 VNI as VN ID 443. The ARP is a communication protocol used for discovering a Layer 2 address, or link address, associated with a particular destination address. In the example, the fabric border node 122 recognizes that the destination network ID is a Layer 2 VPN, but does not recognize that the destination MAC address 311 is located in a separate network site, network fabric 130. The fabric border node 122 floods network fabric 120 with the ARP requesting a response from the destination MAC address 311. As the destination MAC address 311 is not located within the network fabric 120, the fabric border node 122 does not receive a reply. In response to not receiving the reply, the method 520 proceeds to block 745.

In block 745, the fabric border node 122 issues a map request in Layer 3 VNI. In an example, the Layer 3 VNI is associated with transit fabric 110, and the map request is communicated to, and received by, the transit control plane node 111. In an example, the transit fabric 110 is a Layer 3 network fabric.

From block 745, the method 520 returns to block 530 of FIG. 5.

Referring back to block 720, if the fabric border node 122 determines that the destination network ID is not a Layer 2 VPN, the method 520 proceeds to block 730.

In block 730, the fabric border node 122 determines if the destination network ID is local to network fabric 120. In an example, the fabric border node 122 transmits a mapping request to the control plane node 121. The control plane node 121 uses the map resolver function, previously discussed in reference to FIG. 1, to determine if a map registration for the destination network ID with the destination MAC address 311 is stored in the map server. If a map registration is present in the map server, the control plane node 121 transmits a map reply to the fabric border node 122, and the method 520 proceeds to block 735.

In block 735, the fabric border node 122 forwards the VXLAN encapsulated Layer 2 frame 400 to the local destination. In the continuing example, the fabric border node 122 uses a route from the control plane node 121 map reply to transmit the VXLAN encapsulated Layer 2 frame 400 to a fabric edge node 123 associated with the destination MAC address 311. The fabric edge node 123 decapsulates the VXLAN encapsulated Layer 2 frame 400 and forwards the Layer 2 frame 300 to the destination MAC address 311.

Returning to block 730, if a map registration is not present in the map server of the control plane node 121, the method 520 proceeds to block 740.

In block 740, the fabric border node 122 proxies an ARP reply. Proxy ARP is a method that allows a proxy device on a given network, such as fabric border node 122 in network fabric 120, to respond to ARP queries for an address that is not on the given network. The proxy ARP allows the fabric border node 122 to answer queries for the destination MAC address 311. If the fabric border node 122 was aware of a route to the destination MAC address 311, the fabric border node 122 could receive network traffic, such as the VXLAN encapsulated Layer 2 frame 400, addressed to the destination MAC address 311 as a proxy, and route the traffic to the destination MAC address 311. However, as the destination MAC address 311 is located on a separate site, network fabric 130, the fabric border node 122 is unable to route the VXLAN encapsulated Layer 2 frame 400 to the destination MAC address 311. In this case, method 520 proceeds to block 745, previously described herein.

As previously described herein, from block 745, the method 520 returns to block 530 of FIG. 5.

In block 530, the transit control plane node 111 transmits a map reply to fabric border node 122. Block 530 is described in greater detail herein with reference to the method 530 of FIG. 8.

In block 805, the transit control plane node 111 receives the map request in Layer 3 VNI from the fabric border node 122. In an example, the map request is comprised of the VN ID 443 from the VXLAN header 440.

In block 810, the transit control plane node 111 uses a map resolver to lookup VN ID 443 extracted from the VXLAN header 440. In an example, the VN ID 443 may be a Layer 2 VNI, a Layer 3 VNI, or the transit control plane node 111 may not recognize the VNI encapsulated within the VXLAN header 440. The map resolver feature of the transit control plane node 111 searches the map server associated with the transit control plane node 111 for VN ID 443 extracted from the VXLAN header 440.

In block 815, the transit control plane node 111 determines if VN ID 443 is a Layer 2 VNI. In the continuing example, the transit control plane node 111 uses the retrieved mapping to determine if VN ID 443 is mapped to a Layer 2 VNI.

If the transit control plane node 111 determines in block 815 that VN ID 443 is a Layer 2 VNI, the method 530 proceeds to block 835.

In block 835, the transit control plane node 111 generates a map reply with the Layer 2 VNI and stores the map reply in Layer 2 cache. The map reply associates VN ID 443 with the retrieved mapping to the Layer 2 VNI in the network fabric 130.

In block 840, the transit control plane node 111 transmits the map reply to the fabric border node 122.

From block 840, the method 530 returns to block 540 of FIG. 5.

Referring back to block 815, if the transit control plane node 111 determines that VN ID 443 is not a Layer 2 VNI, the method 530 proceeds to block 820. In block 820, the transit control plane node 111 determines if VN ID 443 is a Layer 3 VNI. In the continuing example, the transit control plane node 111 uses the retrieved mapping to determine if VN ID 443 is mapped to a Layer 3 VNI. If the transit control plane node 111 determines that VN ID 443 is a Layer 3 VNI, the method 530 proceeds to block 825.

In block 825, the transit control plane node 111 generates a map reply with the Layer 3 VNI and stores the map reply in Layer 3 cache. The map reply associates VN ID 443 with the retrieved mapping to the Layer 3 VNI. The method 530 then proceeds to block 840, discussed previously.

Returning to block 820, if the transit control plane node 111 determines that VN ID 443 is not a Layer 3 VNI, the method 530 proceeds to block 830.

In block 830, the transit control plane node 111 generates a negative map reply and stores the map reply in Layer 2 and Layer 3 cache. In an example, the negative map reply indicates that the transit control plane node 111 was unable to retrieve a mapping associated with VN ID 443 to either a Layer 2 VNI or a Layer 3 VNI. The method 530 then proceeds to block 840, discussed previously.

As discussed previously, from block 840, the method 530 returns to block 540 of FIG. 5. In block 540, the fabric border node 122 receives the map reply from the transit control plane node 111 and transmits the VXLAN encapsulated Layer 2 frame 400 to the destination fabric border node 132 based on the instructions in the map reply. The fabric border node 122 receives the map reply that associates VN ID 443 to the Layer 2 VNI of the network fabric 130. The fabric border node 122 re-encapsulates the VXLAN encapsulated Layer 2 frame 400 with the mapping from the map reply as an outer header of the VXLAN encapsulated Layer 2 frame 400. The fabric border node 122 forwards the re-encapsulated VXLAN encapsulated Layer 2 frame 400 to a destination fabric border node 132 associated with the Layer 2 VNI of the network fabric 130.

In an alternate example, the fabric border node 122 receives a map reply that associates VN ID 443 to a Layer 3 VNI. The fabric border node 122 re-encapsulates the VXLAN encapsulated Layer 2 frame 400 with the mapping from the map reply as an outer header of the VXLAN encapsulated Layer 2 frame 400. The fabric border node 122 forwards the re-encapsulated VXLAN encapsulated Layer 2 frame 400 to a destination fabric border node associated with the Layer 3 VNI.

In a second alternate example, the fabric border node 122 receives a negative map reply indicating that the transit control plane node 111 was unable to retrieve a mapping associated with VN ID 443 to either a Layer 2 VNI or a Layer 3 VNI. The fabric border node 122 is unable to forward the VXLAN encapsulated Layer 2 frame 400.

In block 550, the destination fabric border node 132 of the network fabric 130 receives the VXLAN encapsulated Layer 2 frame 400. The destination fabric border node 132 decapsulates the VXLAN encapsulated Layer 2 frame 400 and extracts the destination MAC address 311 from the MAC header 310 of the Layer 2 frame 300 encapsulated within the VXLAN encapsulated Layer 2 frame 400.

In block 560, the destination fabric border node 132 routes the VXLAN encapsulated Layer 2 frame 400 to a destination fabric edge node associated with the destination MAC address 311. In an example, the destination fabric edge node is destination fabric edge node 133. Destination fabric border node 132 obtains a route from the destination fabric border node 132 to the destination fabric edge node 133. In an example, the route may be obtained from a database local to the destination fabric border node 132, the destination fabric border node 132 may transmit a map request to the control plane node 131 for a route to the destination fabric edge node 133, or the route may be obtained in any other suitable manner.

In block 570, the destination fabric edge node 133 decapsulates the VXLAN encapsulated Layer 2 frame 400. The destination fabric edge node 133 extracts the destination MAC address 311 from the MAC header 310 of the Layer 2 frame 300.

In block 580, the destination fabric edge node 133 forwards the Layer 2 frame 300 to the destination MAC address 311. In an example, the destination MAC address 311 is associated with host device 134 in the network fabric 130.

Other Examples

FIG. 9 depicts a computing machine 2000 and a module 2050 in accordance with certain examples. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components such as a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a router or other network node, a vehicular information system, one or more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor ("DSP"), an application specific integrated circuit ("ASIC"), a graphics processing unit ("GPU"), a field programmable gate array ("FPGA"), a programmable logic device ("PLD"), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. The processor 2010 along with other components of the computing machine 2000 may be a virtualized computing machine executing within one or more other computing machines.

The system memory 2030 may include non-volatile memories such as read-only memory ("ROM"), programmable read-only memory ("PROM"), erasable programmable read-only memory ("EPROM"), flash memory, or any other device capable of storing program instructions or data with or without applied power. The system memory 2030 may also include volatile memories such as random access memory ("RAM"), static random access memory ("SRAM"), dynamic random access memory ("DRAM"), and synchronous dynamic random access memory ("SDRAM"). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device such as the storage media 2040.

The storage media 2040 may include a hard disk, a floppy disk, a compact disc read only memory ("CD-ROM"), a digital versatile disc ("DVD"), a Blu-ray disc, a magnetic tape, a flash memory, other non-volatile memory device, a solid state drive ("SSD"), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules such as module 2050, data, or any other information. The storage media 2040 may be part of, or connected to, the computing machine 2000. The storage media 2040 may also be part of one or more other computing machines that are in communication with the computing machine 2000 such as servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits such as microcode or configuration information for an FPGA or other PLD.

The input/output ("I/O") interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, such as small computer system interface ("SCSI"), serial-attached SCSI ("SAS"), fiber channel, peripheral component interconnect ("PCP"), PCI express (PCIe), serial bus, parallel bus, advanced technology attached ("ATA"), serial ATA ("SATA"), universal serial bus ("USB"), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include WANs, LANs, intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or an analog communication media such as fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. Any of the processor 2010, the other elements of the computing machine 2000, or the various peripherals discussed herein may be integrated into a single device such as a system on chip ("SOC"), system on package ("SOP"), or ASIC device.

Examples may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing examples in computer programming, and the examples should not be construed as limited to any one set of computer program instructions. Further, a skilled programmer would be able to write such a computer program to implement an example of the disclosed examples based on the appended flow charts and associated description in the application text. Therefore, disclosure of a particular set of program code instructions is not considered necessary for an adequate understanding of how to make and use examples. Further, those skilled in the art will appreciate that one or more aspects of examples described herein may be performed by hardware, software, or a combination thereof, as may be embodied in one or more computing systems. Moreover, any reference to an act being performed by a computer should not be construed as being performed by a single computer as more than one computer may perform the act.

The examples described herein can be used with computer hardware and software that perform the methods and processing functions described herein. The systems, methods, and procedures described herein can be embodied in a programmable computer, computer-executable software, or digital circuitry. The software can be stored on computer-readable media. Computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays ("FPGA"), etc.

The systems, methods, and acts described in the examples presented previously are illustrative, and, alternatively, certain acts can be performed in a different order, in parallel with one another, omitted entirely, and/or combined between different examples, and/or certain additional acts can be performed, without departing from the scope and spirit of various examples. Accordingly, such alternative examples are included in the scope of the following claims, which are to be accorded the broadest interpretation so as to encompass such alternate examples.

Although specific examples have been described above in detail, the description is merely for purposes of illustration. It should be appreciated, therefore, that many aspects described above are not intended as essential elements unless explicitly stated otherwise. Modifications of, and equivalent components or acts corresponding to, the disclosed aspects of the examples, in addition to those described above, can be made by a person of ordinary skill in the art, having the benefit of the present disclosure, without departing from the spirit and scope of examples defined in the following claims, the scope of which is to be accorded the broadest interpretation so as to encompass such modifications and equivalent structures.

What is claimed is:

1. A method, comprising:
    by one or more computing devices of a transit network:
        receiving, from a first network computing device of a first network, a map request associated with a packet;
        extracting a destination identifier from the map request;
        determining a network type associated with the destination identifier;
        generating a mapping associated with the network type, the mapping comprising a route from the first network computing device of the first network to a second network computing device of a second network associated with the destination identifier; and
        transmitting, to the first network computing device of the first network, a map reply comprising the mapping.

2. The method of claim 1, further comprising:
    by the first network computing device:
        receiving, from the one or more computing devices, the map reply comprising the route from the first network computing device of the first network to the second network computing device of the second network; and
        transmitting the packet to the second network computing device of the second network based on the map reply.

3. The method of claim 1, further comprising:
    by the first network computing device:
        receiving, from a first network edge device, the packet comprising a header and a data set;
        extracting a source identifier and the destination identifier from the header;
        based on the source identifier matching the destination identifier, determining if the network type is a particular network type;
        transmitting, to devices within the first network, an address request; and
        in response to not receiving a reply to the address request, transmitting the map request to the one or more computing devices.

4. The method of claim 3, wherein the particular network type is a Layer 2 network.

5. The method of claim 1, wherein the transit network is a Layer 3 network.

6. The method of claim 1, wherein the packet is a Layer 2 frame.

7. The method of claim 1, wherein the first network is a Layer 2 network, and wherein the second network is a Layer 2 network.

8. The method of claim 1, wherein the transit network, the first network, and the second network are located on separate network sites.

9. The method of claim 1, further comprising:
    by the second network computing device:

receiving, from the first network computing device of the first network, the packet comprising a header and a data set;

extracting a destination address from the header; and transmitting, to a computing device associated with the destination address, the data set.

10. A computer program product, comprising:

a non-transitory computer-readable medium having computer-readable program instructions embodied thereon that, when executed by a transit network computer associated with a transit network, cause the transit network computer to:

receive, from a first network computing device of a first network, a map request associated with a packet;

extract a destination identifier from the map request;

determine a network type associated with the destination identifier;

generate a mapping associated with the network type, the mapping comprising a route from the first network computing device of the first network to a second network computing device of a second network associated with the destination identifier; and transmit, to the first network computing device of the first network, a map reply comprising the mapping.

11. The computer program product of claim 10, further comprising:

a non-transitory computer-readable medium having computer-readable program instructions embodied thereon that, when executed by the first network computing device, cause the first network computing device to:

receive, from the transit network computer, the map reply comprising the route from the first network computing device of the first network to the second network computing device of the second network; and transmit the packet to the second network computing device of the second network based on the map reply.

12. The computer program product of claim 11, further comprising computer-readable program instructions to:

receive, from a first network edge device, the packet comprising a header and a data set;

extract a source identifier and the destination identifier from the header;

based on the source identifier matching the destination identifier, determine if the network type is a particular network type;

transmit, to devices within the first network, an address request; and in response to not receiving a reply to the address request, transmit the map request to the transit network computer.

13. The computer program product of claim 12, wherein the particular network type is a Layer 2 network.

14. The computer program product of claim 10, wherein the transit network is a Layer 3 network.

15. The computer program product of claim 10, wherein the packet is a Layer 2 frame.

16. A system, comprising:

a transit network storage device; and a transit network processor communicatively coupled to the storage device, wherein the transit network processor executes application code instructions that are stored in the transit network storage device to cause the system to:

receive, from a first network computing device of a first network, a map request associated with a packet;

extract a destination identifier from the map request;

determine a network type associated with the destination identifier;

generate a mapping associated with the network type, the mapping comprising a route from the first network computing device of the first network to a second network computing device of a second network associated with the destination identifier; and transmit, to the first network computing device of the first network, a map reply comprising the mapping.

17. The system of claim 16, further comprising:

a first network storage device; and a first network processor communicatively coupled to the first network storage device, wherein the first network processor executes application code instructions that are stored in the first network storage device to cause the system to:

receive, from the transit network processor, the map reply comprising the route from the first network computing device of the first network to the second network computing device of the second network; and transmit the packet to the second network computing device of the second network based on the map reply.

18. The system of claim 17, further comprising application code instructions to:

receive, from a first network edge device, the packet comprising a header and a data set;

extract a source identifier and the destination identifier from the header;

based on the source identifier matching the destination identifier, determine if the network type is a particular network type;

transmit, to devices within the first network, an address request; and in response to not receiving a reply to the address request, transmit the map request to the transit network processor.

19. The system of claim 18, wherein the particular network type is a Layer 2 network.

20. The system of claim 16, wherein the packet is a Layer 2 frame.

* * * * *